Jan. 30, 1934.   R. VELDHUYZEN   1,945,006
AMPLIFIER ARRANGEMENT
Filed Feb. 18, 1931
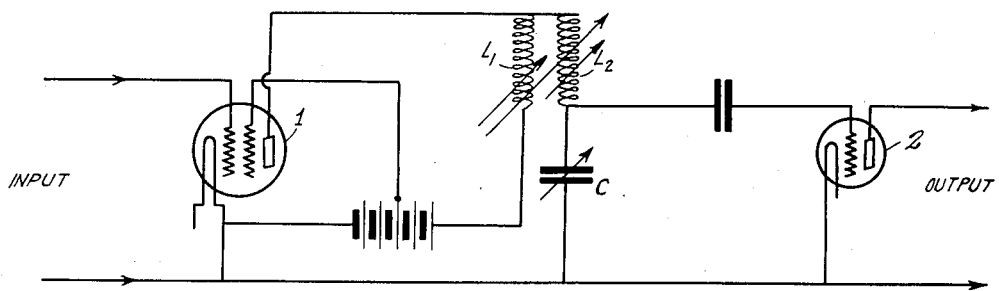
INVENTOR
ROMYN VELDHUYZEN
BY
ATTORNEY Patented Jan. 30, 1934

1,945,006

UNITED STATES PATENT OFFICE 1,945,006

AMPLIFIER ARRANGEMENT

Romyn Veldhuyzen, Eindhoven, Netherlands, assignor to Radio Corporation of America, a corporation of Delaware Application February 18, 1931, Serial No. 516,548, and in the Netherlands October 11, 1930

9 Claims. (Cl. 179—171)

This invention relates to high frequency amplifying circuit arrangements, and has for its main purpose to obtain a greater amplification, and in addition a better selectivity.

According to the invention this is attained by disposing a coupling network between two successive amplification stages, said network being constituted by two parallel branches which are inductively coupled with respect to each other, one of these branches comprising an inductance coil, and the second branch an inductance coil and a condenser which are connected in series.

This series connection is tuned to the frequency to be received. Consequently, series resonance is used, owing to which the current passing through this branch will be large. By coupling both inductance coils the current passing through said branch will be increased which results in that the amplification increases too. If the coupling factor of both self-inductances is properly chosen, then at the same time, the selectivity becomes also greater than with a normal circuit arrangement. The coupling may be changed by modifying the size of each of the inductance coils, as well as by modifying the distance between them.

In this circuit arrangement preferably coils are used whose self-inductances are of the same order of magnitude. The right ratio of the self-inductances depends on the type of the tubes used. When using, for example, screen grid tubes it has been found that excellent results may be obtained if both inductance coils have an equal number of windings. The size of the coils may be calculated, or, again, determined empirically for each type of tube to be used. In practice, the exact adjustment to the required value is obtained by modifying the distance between the coils. For this reason this distance is rendered adjustable.

The novel features which I believe to be characteristic of my invention are set forth in particularity in the appended claims, the invention itself, however, as to both its organization and method of operation will best be understood by reference to the following description taken in connection with the drawing in which I have indicated diagrammatically one circuit arrangement whereby my invention may be carried into effect.

In the drawing a coupling network, according to the invention, is shown which serves for the coupling between two stages of a high frequency amplifier. The first tube 1 is a screen grid tube, two parallel branches being inserted in the output circuit, one of these branches comprising an inductance $L_1$, and the second branch comprising a series-connection of an inductance $L_2$ and a variable condenser $C$. The coils $L_1$ and $L_2$ are coupled with one another. The anode direct current is supplied through the coil $L_1$, to the anode of the first tube. The anode alternating currents are supplied through the coil $L_1$, as well as through the coil $L_2$ together with the series condenser $C$.

The sense of coupling of both coils is additive, that is it is so chosen that the current passing through $L_2C$ is increased. The potential for the input circuit of the second amplifying tube 2 is derived across the condenser $C$. Though the coil $L_2$ and the condenser $C$ are in resonance so that, also, the potentials set up in both impedances are equal, it is advisable to derive the voltage from the condenser. In fact, if this voltage were derived from the inductance coil, then a capacity would be coupled in parallel thereto by the grid-filament capacity of the amplifying tube due to which the potential decreases.

Parallel connection of the grid-filament capacity to the condenser $C$ only results in that this condenser must be adjusted to a slightly different value such that the total capacity in series with the inductance coil $L_2$ is tuned to the frequency received. In this case the potential imparted to the grid of the next tube will be normal. That is, the potential fed to the grid of tube 2 will then be the resonant value of potential.

An additional advantage of this circuit arrangement consists in that the retroaction across the grid-anode capacity of the preceding tube is smaller than with the normal circuit arrangements. In fact, the variations of the anode voltage on this preceding tube correspond to the voltage variations across $L_2$ and $C$ in series, and are consequently much smaller than the variations occurring across the condenser $C$, because in this case series-resonance is used.

While I have indicated and described one arrangement for carrying my invention into effect, it will be apparent to one skilled in the art that my invention is by no means limited to the particular organization shown and described, but that many modifications may be made without departing from the scope of my invention as set forth in the appended claims.

What I claim is:

1. In a tube coupling system, the combination with a pair of electron discharge tubes in cascade, of an inductive reactance connected between the anode and cathode of one of the tubes, a condensive reactance and a second inductive reactance connected in series with each other and between said anode and cathode, each of said inductive reactances being adjustable in magnitude, the input electrodes of the other tube being connected across said condensive reactance, and said inductive reactances being adjustably coupled.

2. In a tube coupling system, the combination with a pair of electron discharge tubes in cascade, of an inductive reactance connected between the anode and cathode of one of the tubes, a condensive reactance and a second inductive reactance connected in series with each other and between said anode and cathode, the input electrodes of the other tube being connected across said condensive reactance, and said inductive reactances being coupled, said condensive reactance being adjustable to tune said second inductive reactance and the input of the other tube to a desired frequency.

3. In a tube coupling system, the combination with a pair of electron discharge tubes in cascade, of an inductive reactance connected between the anode and cathode of one of the tubes, a condensive reactance and a second inductive reactance connected in series with each other and between said anode and cathode, the input electrodes of the other tube being connected across said condensive reactance, and said inductive reactances being coupled in an additive sense.

4. In a tube coupling system, the combination with a pair of electron discharge tubes in cascade, of an inductive reactance connected between the anode and cathode of one of the tubes, a condensive reactance and a second inductive reactance connected in series with each other and between said anode and cathode, the input electrodes of the other tube being connected across said condensive reactance, said inductive reactances being coupled in an additive sense, and a current source in series with said first inductive reactance and said cathode to supply said anode with a desired positive potential.

5. In a tube coupling system, the combination with a pair of electron discharge tubes in cascade, of an inductive reactance connected between the anode and cathode of one of the tubes, a condensive reactance and a second inductive reactance connected in series with each other and between said anode and cathode, said condensive reactance being adjustable to tune its series reactance to a desired frequency, the input electrodes of the other tube being connected across said condensive reactance, and said inductive reactances being coupled, said one tube being provided with a screen grid electrode, a potential source connected with said first inductive reactance to supply a positive potential to said anode, said screen grid being connected to a desired point on said source.

6. In a tube coupling system, the combination with a pair of electron discharge tubes in cascade, of an inductive reactance connected between the anode and cathode of one of the tubes, a condensive reactance and a second inductive reactance connected in series with each other and between said anode and cathode, the input electrodes of the other tube being connected across said condensive reactance, and said inductive reactances being coupled, and means for adjusting the coupling of said inductive reactances.

7. A radio frequency amplifier comprising a screen grid amplifier tube, a succeeding amplifier tube, a coupling network connected between the output of the screen grid tube and the amplifier tube input, the network including a coil connected in series between the anode and cathode of the screen grid tube, a second coil coupled to the first coil and having one end thereof connected to the anode of the screen grid tube, a variable tuning condenser in series with said second coil and connected between the cathode of the screen grid tube and the other end of said second coil, and means for connecting the input electrodes of the succeeding amplifier tube across the variable condenser.

8. In combination with a pair of successive high frequency amplifier tubes, a coupling network comprising a pair of parallel branches, one of the branches including a coil connected in the anode circuit of the first of the tubes, the other branch including a coil and variable condenser, said condenser being adapted to series resonate the said other branch to a frequency to be received, means for coupling the second of said tubes across said condenser, said coils being coupled in such a sense that the current passing through said resonant branch increases and the selectivity increases.

9. In combination with a pair of successive high frequency amplifier tubes, a coupling network comprising a pair of parallel branches, one of the branches including a coil connected in the anode circuit of the first of the tubes, the other branch including a coil and variable condenser, said condenser being adapted to series resonate the said other branch to a frequency to be received, means for coupling the second of said tubes across said condenser, said coils being coupled in such a sense that the current passing through said resonant branch increases and the selectivity increases, the self-inductances of said coils being of the same order of magnitude.

ROMYN VELDHUYZEN.